United States Patent [19]

Okor

[11] 4,126,851
[45] Nov. 21, 1978

[54] PROGRAMMABLE TELEVISION GAME SYSTEM

[76] Inventor: Joseph K. Okor, 516 Green St., Cambridge, Mass. 02139

[21] Appl. No.: 758,414

[22] Filed: Jan. 11, 1977

Related U.S. Application Data

[63] Continuation-in-part of Ser. No. 627,960, Nov. 3, 1975, abandoned.

[51] Int. Cl.² ............................................. G06K 15/20
[52] U.S. Cl. ..................... 340/324 AD; 273/DIG. 28
[58] Field of Search ................... 340/324 A, 324 AD; 331/1 R, 108 B; 273/DIG. 28

[56] References Cited

U.S. PATENT DOCUMENTS

| 3,221,260 | 11/1965 | Henrion | 331/1 R |
| 3,569,617 | 3/1971 | Allen et al. | 340/324 AD |
| 3,786,479 | 1/1974 | Brown et al. | 340/324 AD |
| 4,016,362 | 4/1977 | Bristow et al. | 340/324 AD |
| 4,034,990 | 7/1977 | Baer | 340/324 AD |

Primary Examiner—David L. Trafton

Attorney, Agent, or Firm—Morse, Altman, Oates & Bello

[57] ABSTRACT

A television game system is provided wherein a modular unit may be connected to a standard television receiver for the generation, display and control of symbols or geometric figures on the television screen to allow one or several players to participate in a game in which the action is presented on the screen. The modular unit is programmable whereby several different games may be played selectively with the same unit, allowing flexibility in the range of operation of the unit as well as the television receiver. The level of complexity of the games can be adjusted to each player's ability whereby players of different ability can play each other on a competition basis. The system includes circuit components such as a light pen for providing positional information of a symbol on the screen, one or more control units used to control symbols on display and also to send other control information to a computer, a display module which not only generates geometric symbols but formats the video information in such a way that it may be connected to different television receivers and each receiver will show a different aspect of the game or a completely different game.

3 Claims, 12 Drawing Figures

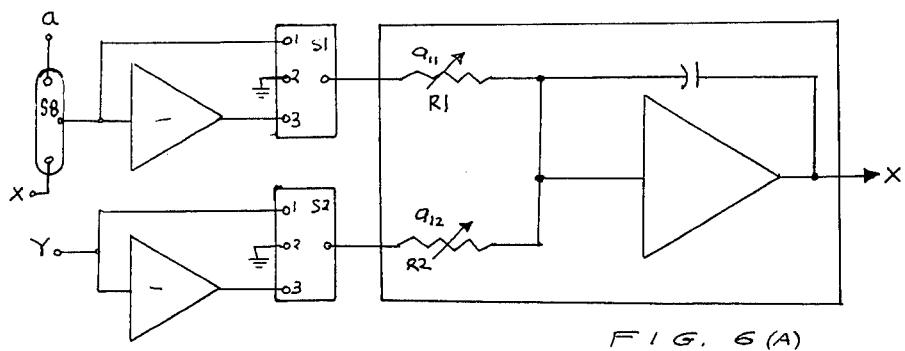
F I G. 6(A)
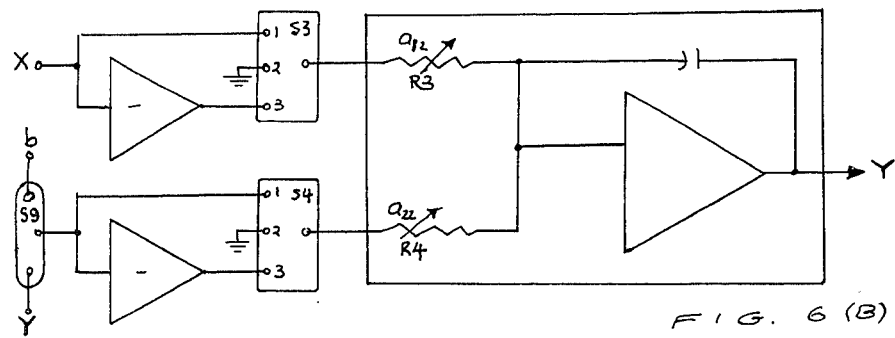
F I G. 6(B)
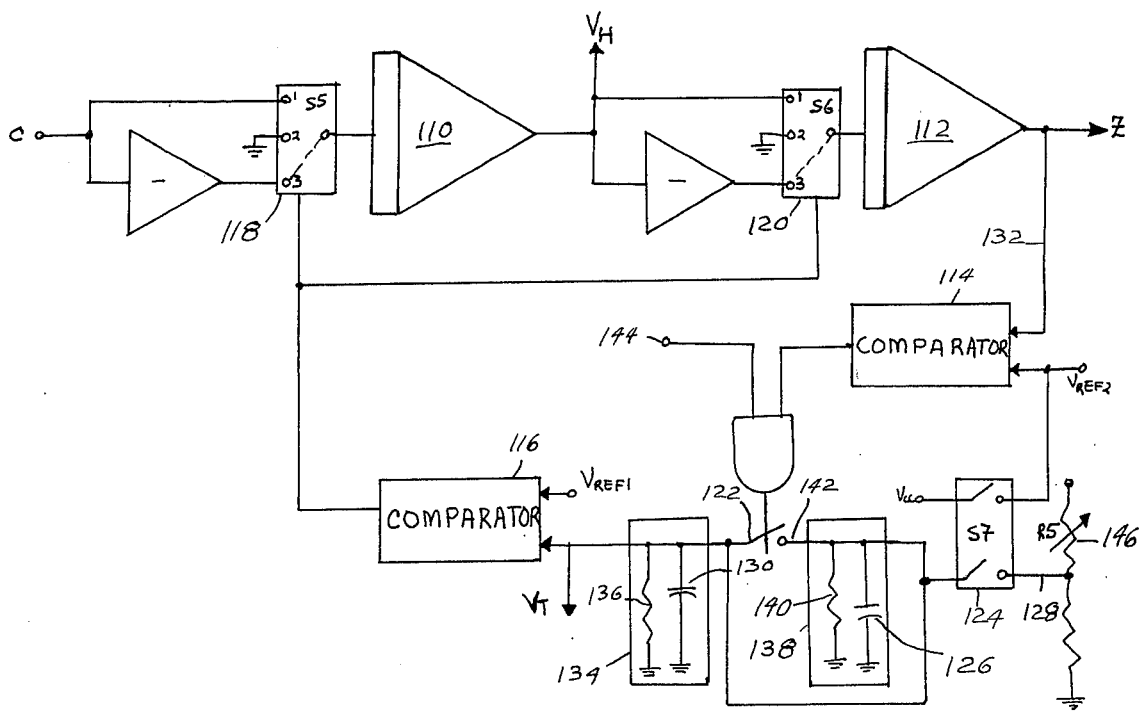
F I G. 6(C)

PROGRAMMABLE TELEVISION GAME SYSTEM

CROSS-REFERENCE TO RELATED APPLICATION

This is a continuation-in-part of U.S. Patent Application Ser. No. 627,960, filed Nov. 3, 1975 by Joseph K. Okor, and now abandoned.

BACKGROUND OF THE INVENTION

1. Field of the Invention

This invention relates to television game systems and more particularly is directed towards a new and improved television game system having a changeable program allowing any one of a variety of different games to be played with the same system.

2. Description of the Prior Art

A number of television display games have been developed wherein typically two players may operate controls adapted to move a symbol on the screen representing a player or the like. Common games of this type have been hockey games in which a moving puck is bounced back and forth between opposing goalies which are moved by the players operating controls on the console. Other games currently available simulate tennis, target shooting and the like. Television game systems of the foregoing types generally are available only in a single mode of operation such as a hockey game, tennis game, etc. This is quite limiting in utility and, as a result, the systems currently available are of limited interest because of their restricted capability.

At the other extreme, those who have access to computers, with or without graphic systems, have written complex simulation programs. However, games of this type have very limited distribution and availability and normally can run only on the computers at the center where the programs were written. As such, they are of no use to the average person having little or no knowledge about computers. Typical games of the foregoing type include chess, tic-tac-toe and space war.

Accordingly, it is an object of the present invention to provide a new and improved modular unit for connection with a standard television receiver and programmable to function in any one of a variety of different modes by means of which participating players may engage in any one of a variety of different games.

Another object of this invention is to provide improvements in television game systems including improvements in symbol generators.

It is yet another object of this invention to provide means by which players remote from one another may play one another by cable TV, telephone, radio, or the like.

It is still another object of this invention to provide a television game system which includes individual adjustment in the level of play complexity for handicapping players of different ability.

SUMMARY OF THE INVENTION

This invention features a programmable module for connection to a standard television receiver, comprising a multiplexer, a plurality of player control boxes, a control module, a timing generator, a modem, a display module and a light pen.

The player control boxes are used to control symbols on display and also to send control information to the computer, the light pen is used to generate positional information, the modem serves as an interface between the system and the external world and the display module for control and also to generate video information for the television receiver. A changeable memory is connectable to the display unit by means of the modem allowing changes in the operation of the unit by interchanging programs.

DETAILED DESCRIPTION OF THE PREFERRED EMBODIMENT

Figure 1:
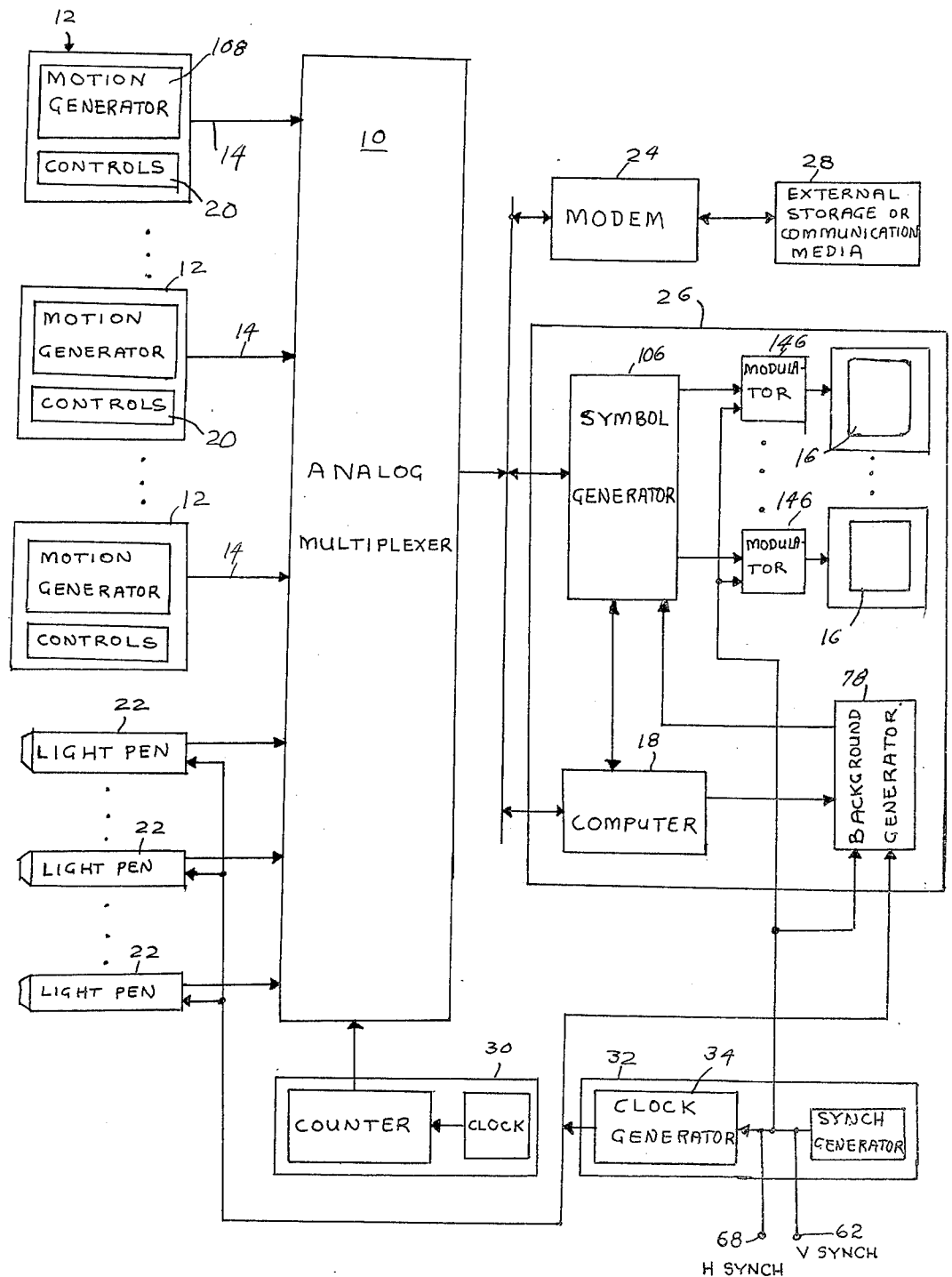
FIG. 1 is a block diagram of a television game system made according to the invention.
Figure 2:
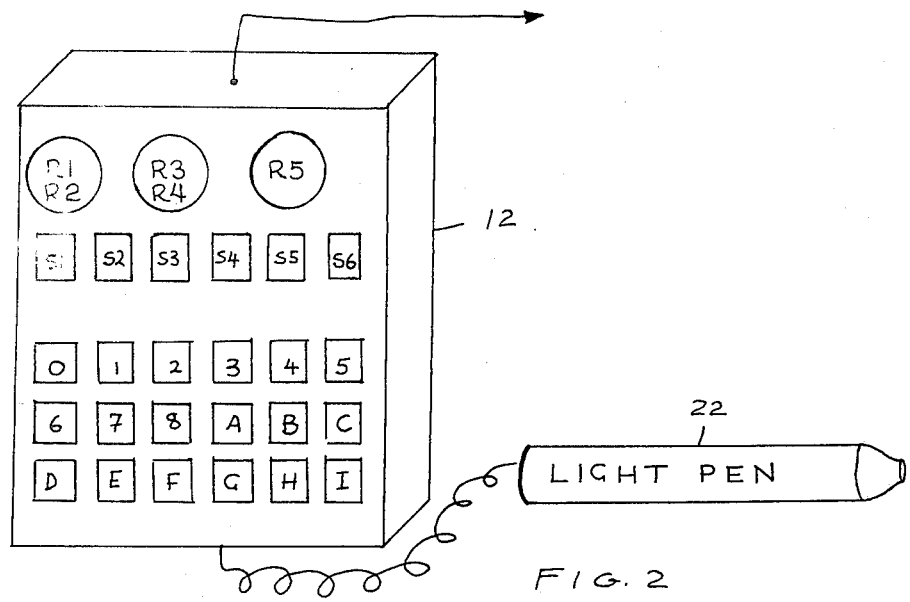
FIG. 2 is a view in perspective of a player control box and light pen made according to the invention.

The present invention is generally organized about an analog multiplexer 10. Operatively connected to the multiplexer 10 is a plurality of player control boxes 12, each identical in function and each connected by a lead 14 to the analog multiplexer 10. A player control box 12 is utilized by each participant in the game that is being simulated to manipulate a symbol appearing on a television screen 16 or to send information to a computer 18 or other players by manipulating controls 20 for each control box. Another input to the analog multiplexer 10 is from a plurality of light pens 22 employed in conjunction with the television screen 16 to provide positional information as will be described more fully below. Also connected to the analog multiplexer 10 is a modem 24 which acts as an interface between one display unit 26, the analog multiplexer 10 and the external world which might include external storage unit 28 such as tape recorders, phonograph discs or communication media, such as radio, TV, cable TV, etc. It is through these sources that programs to play a particular game are obtained or to play games with other players who are remotely located. In addition to the above, the display module 26 may also be connected to the multiplexer 10. The display module 26 is connected to multiplexer 10 only when it is desired to generate symbols and perform control functions locally. Otherwise the display module 26 is located at the location where all of the control functions are to be performed. Thus, in areas served with cable TV, the display module 26 could be located at the cable TV head end and the players could "tune-in" to their game by tuning to the correct channel on the cable.

The multiplexer 10 is controlled by a control module 30 and the timing signals are generated by a timing module 32.

By way of general description, the functions of the various components will be described briefly with a detailed description of individual sub-systems to be set forth below. The television receiver 16, when connected to one display module 26, will present a simulated game on the face of the screen, the particular game as well as its operating rules to be controlled by the particular program instructions furnished by external storage device 28. Each player operates a player control box 12 which is adapted to either generate the address of the location of a symbol or geometric figure on the TV screen or to generate some control information to be used by the computer in performing some operations. The light pen 22 is employed to move objects on display from one location to another, draw and write on the screen, and to detect movements on the face of the screen by methods to be described. The outputs of the players' control box 12 and light pen 22 are transmitted to the display module 26 by means of the multiplexer 10. The outputs of the control boxes 12 and light pen 22 are periodically scanned by the multiplexer 10 under control of the control module 30. The output of the multiplexer 10 is either connected to the display module 26 directly or transmitted to the display module 26 by means of modem 24. The timing of the light pen 22, player control box 12 and display module 26 (local mode) are controlled by the timing module 32.

This display module 26 performs a variety of tasks, the important uses being: (1) Given the address of the symbols, it generates a symbol at the addressed location. (2) It also distributes the resulting video signals to the available display channels and, finally, (3) the computer 18 is used to control the game(s) in progress.

Figure 8:
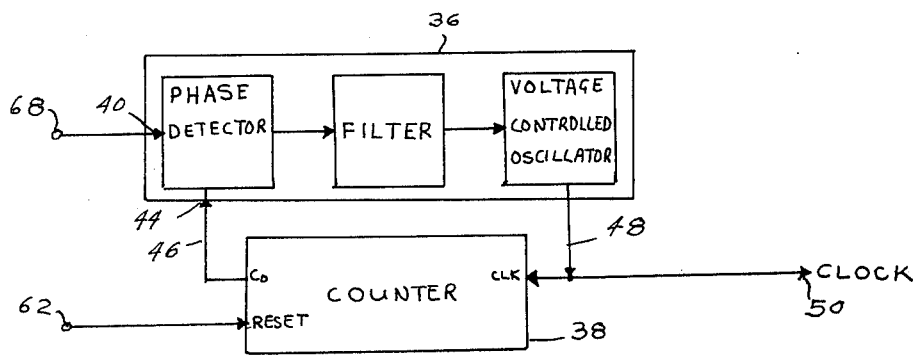

Referring now to FIG. 8, there is shown in block diagram a clock generator 34 forming part of the timing module 32. If each line of the raster of a line scan display is considered to be composed of a plurality of discrete dot elements, the address of each dot on the line can be determined by counting the number of dots from the beginning of a line to the dot location. The circuit of FIG. 8 is used to determine the location of each discrete dot element on a raster scan line. It consists of phased locked loop device 36 and counter 38. Connected to one of the inputs 40 of the phase locked loop device 36 is a horizontal synch pulse 42 and the other input 44 is the overflow pulse 46 of the counter 38. The counter 38 is adapted to generate a pulse at the lead 46 after M clock pulses. M is the number of discrete dot elements per raster line. The phase locked loop device 36 is adapted to generate a clock output at lead 48, whose frequency is M times the frequency at input lead 40. The output at lead 50 of the phase locked loop is a clock pulse required in the timing of the other subsystems.

Figure 3:
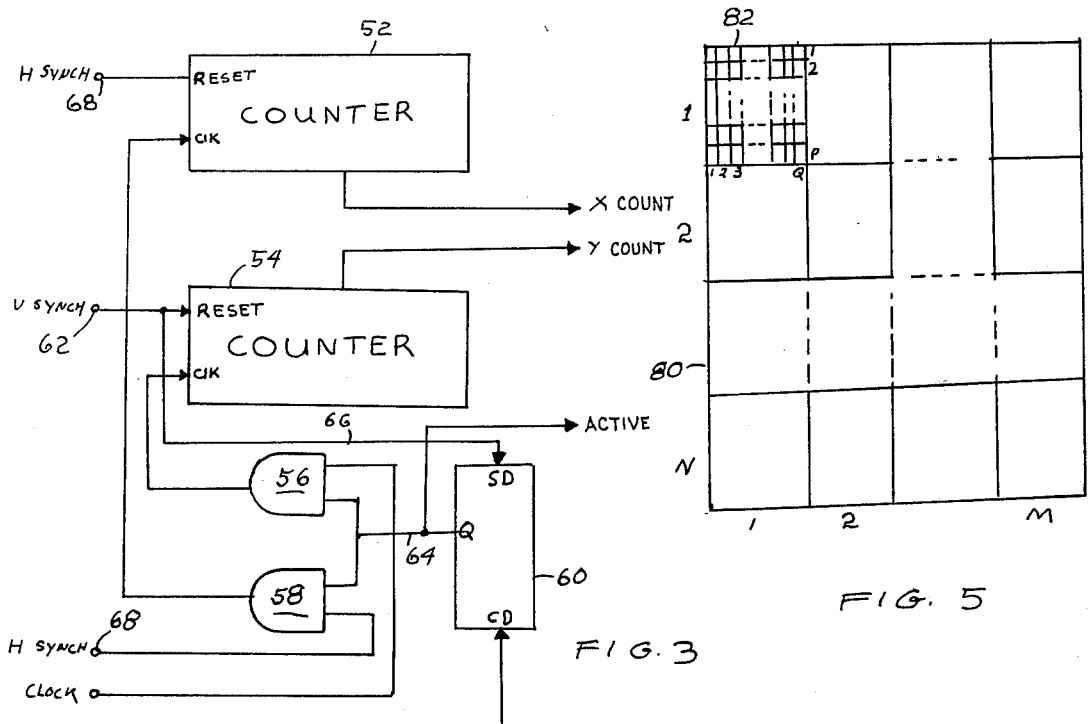
FIG. 3 is a diagram of the control circuit for the light pen.

Referring now to FIG. 3, there is illustrated in block diagram the control circuit for the light pen 22. The control circuit consists of counters 52 and 54, AND gates 56 and 58, latch 60 and light pen 22. At the beginning of each frame, counter 52 set to its initial value, usually zero, by the vertical synch pulse 62 and output 64 of latch 60 is made active by applying the vertical synch 62 to lead 66 of latch 60. At the beginning of each line, the counter 52 is initialized, usually to zero, by a horizontal synch pulse 68. The counter 52 is adapted to have a capacity greater than M clock pulses where M is the number of discrete dots per line and the counter 54 is adapted to have capacity greater than N where N is the number of lines per frame. When output 64 of latch 12 is active, counters 52 and 54 are enabled to count. The output 70 of the light pen 22 is used to disable the counters by making the output 64 of latch 60 inactive. At the beginning of each frame, the computer "looks" at the output on lead 64, if it is inactive, then the light pen "saw" a dot during the last frame and the address of the dot is the content of counters 52 and 54.

In operation, the light pen 22 is pointed toward the face of the television screen so that light emitted by the screen will illuminate a photo-sensitive device 72 contained within the pen 22. The output of device 72 is amplified by means of an amplifier 74 with the amplified signal being fed to the pulse shaper 76 adapted to generate a pulse on output lead 70. Counter 54 gives the line number of the dot and counter 52 gives the location of the dot on the given line.

Figure 4:
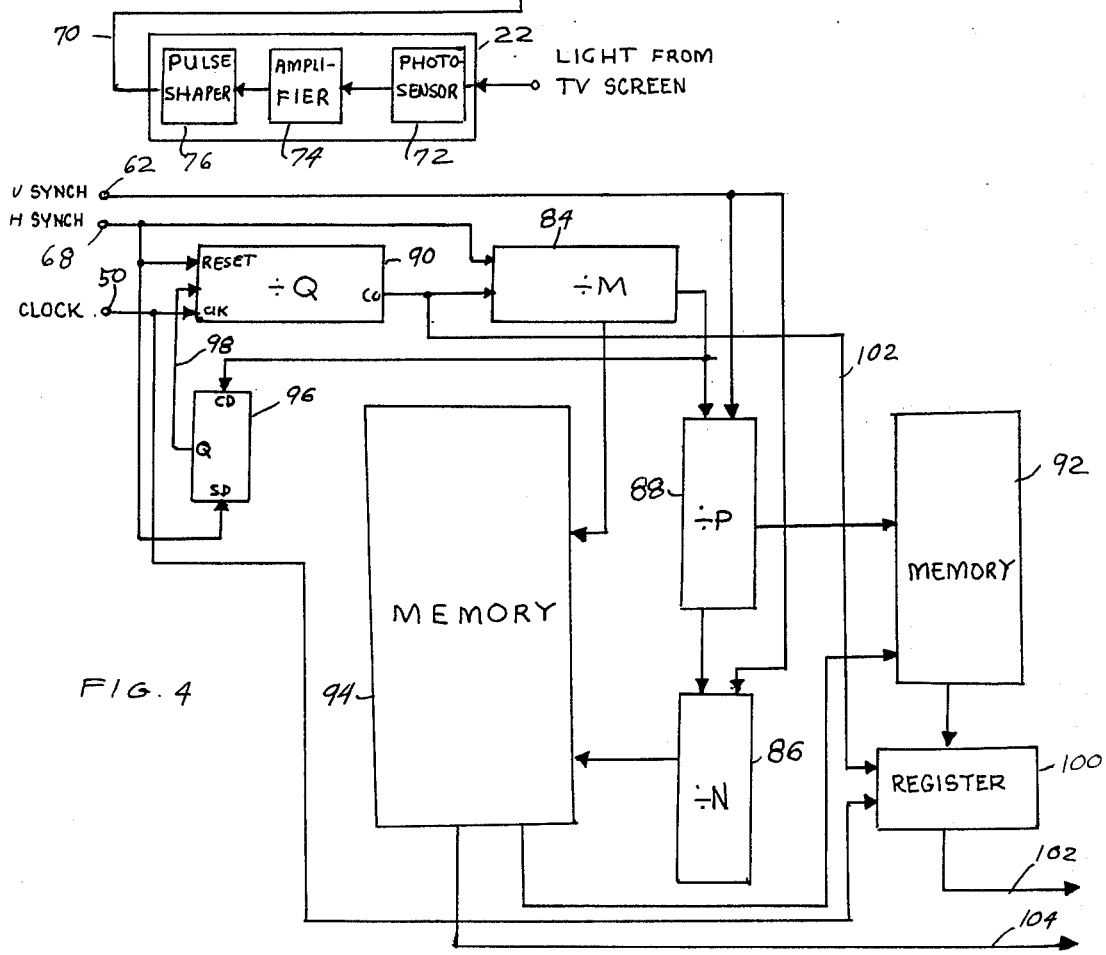
FIG. 4 is a diagram of the background generator.

Referring to FIG. 4, there is shown a block diagram of a background generator 78. It is well known in the art that there is a substantial amount of redundancy in any given picture image. Thus, if it is possible to isolate only the relevant information, the size of the memory required to store pictures is reduced. The technique described herein involves isolating the distinctive features of the picture and using those features as building blocks to reconstruct the original picture. This technique is analogous to building a house using prefabricated parts.

Figure 5:
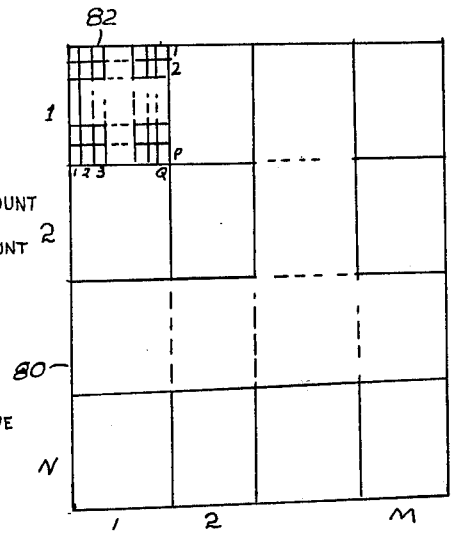
FIG. 5 is a representation of a grid produced by the background generator of FIG. 4, FIGS. 6(a), 6(b) and 6(c) are diagrams of circuits used to control the motions of symbols on the display.

In order to generate the building blocks, the picture is drawn on a grid 80 as shown in FIG. 5. From this grid the standard parts are isolated and drawn on a smaller grid 82 defined by the matrix of size Q × P. The contents of each point in the matrix is the color of the symbol at that point. The standard parts are numbered and the standard block occupying each of the N × M grid, plus any other relevant information, are stored in a storage medium for later use. In order to display the picture, counters 84, 86, 88 and 90 are loaded with M, N, P and Q. The standard blocks are loaded in a memory 92 and the number of the standard block plus the other information stored on each of the blocks occupying the N × M grid is loaded into a memory 94.

In operation, the entire screen of the television is arranged as an array of N × M of which each block of the array is further arranged as an array of size Q × P. Since a TV receiver is a line scan display device, the information is displayed line by line. The display is synchronized by vertical and horizontal synch signals from the beginning of each frame, all the counters 84, 86, 88 and 90 are initialized by the vertical synch pulse 62. At the beginning of each line, a horizontal synch pulse 68 is used to initialize counters 90 and 84 and to set a latch 96 where the output on a lead 98 is used to enable the counter 90. The overflow pulse on lead 98 of the counter 84 is used to clear latch 96 and also as a clock to the other counters. The outputs of counters 86 and 84 select a block from the N × M array. Part of the output of the word of memory 94 is the number of the standard block stored in memory 92. This, in conjunction with the output of the counter 88, selects one row of a standard part. This is loaded into a register 100 by the output at lead 102 of counter 96. The contents of the register 100 are shifted out by the clock 50. The output of register 100 on lead 102 is the color of the picture at that location, together with the remaining portion of the output register at lead 104 of the memory 94 are connected to the video combiner in a symbol generator 106.

The player control box 12 of FIG. 1 includes a motion generator 108 and controls 20. By way of explanation, the motion of an object in a 3-D space may be presented as an equation in the following form:

$$\dot{x} = a_{11} x(t) + a_{12} y(t) + a_{13} z(t) + b_1(t)$$

$$\dot{y} = a_{21} x(t) + a_{22} y(t) + a_{23} z(t) + b_2(t)$$

$$\dot{z} = a_{31} x(t) + a_{32} y(t) + a_{33} z(t) + b_3(t)$$

wherein $a_{ij}$ $i = 1$ to 3 and $j = 1$ to 3 are constants which may be functions of time.

With initial values $(x_o, y_o, z_o)$ the solution to the above equation $(x, y, z)$ gives the location of the object at any given time.

By changing the parameters $a_{ij}$ different motions can be generated.

In this embodiment, the equation for the motion of a symbol is:

$$\dot{x} = a_{11} \times (t) + a_{12} y (t)$$

$$\dot{y} = a_{21} \times (t) + a_{22} y (t)$$

$$\dot{z} = b_1$$

with initial conditions $(x_o, y_o, z_o)$ and all $a_{11}, a_{12}, a_{21}, a_{22}, b_1$ are constant which the user can vary. FIGS. 6(a) and 6(b) show the circuitry for solving the above equations. The solution $(x, y, z)$ gives the location of the symbol at any given time.

Referring now to FIG. 6(c), there is illustrated the circuit used to generate the z component of the motion of the symbol. It consists of integrators 110 and 112, comparators 114 and 116 and voltage controlled switches 118, 120, 122 and 124.

Figure 7:
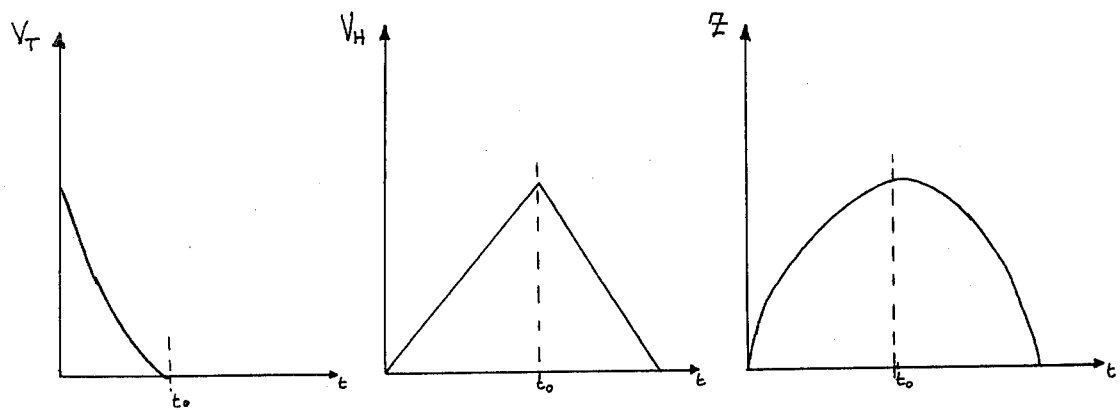
FIGS. 7(a), 7(b) and 7(c) are diagrams demonstrating the operation of the circuit of FIG. 6(c), and, FIG. 8 is a block diagram of the clock generator employed in the invention.

Initially, voltages $Z_1$, $V_4$ and $V_T$ are zero. Switch 124 is off. When switch 124 is closed, capacitor 126 is charged to voltage at lead 128. Since switch 122 is closed, capacitor 130 is also charged to the same value. $V_T$ becomes active and switches switches 118 and 120 in such a way that integrators 110 and 112 integrate in the positive direction. As soon as voltage at lead 132 exceeds $V_{REF2}$, switch 122 is opened. Meanwhile a delay network 134, consisting of capacitor 130 and resistor 136, and delay network 138, consisting of resistor 140 and capacitor 126, time out. The delay network 134 is shorter than the delay 138. When $V_L$ falls below $V_{REF2}$, switch 122 is again closed, the voltage at lead 142 is connected to the capacitor 130 and the process described above is repeated until the voltage at lead 132 is finally zero. The voltage at lead 142 drops every cycle and finally it gets down to zero. The switch 124 is a voltage controlled momentary switch. The timing waveforms are shown in FIG. 7. When the input on a lead 144 is inactive, the symbol will bounce only once. A variable resistor 146 is used to control the height to which the symbol will bounce.

The display module 26 consists of a symbol generator 106 modulator 146 background generator 78 and computer 18.

The circuit and operation of the symbol generator 106 is more fully disclosed in my concurrently filed patent application entitled "System for Converting Coded Data into Display Data", Ser. No. 758,415 filed Jan. 11, 1977. Basically, the symbol generator 106 takes as an input the address of where the symbol is to be displayed and generates the symbol at that location. The symbol generator 106 also includes a video combiner which not only allows for special effects to be performed on the symbols on display, but also acts as a video distributor in that it can distribute the video to different display devices each of which might show only some part of the complete display.

The outputs of the symbol generator 106 are connected to the display device 16 by means of a modulator 146. The type of modulator 146 used is dependent on the type of display device, how the color information was encoded, and how the composite video is going to be connected to the display device.

If the video is to be transmitted to the display device 16, then the modulator 146 must include an RF transmitter.

The computer 18 controls the timing of the display devices 16 and also executes all programs related to the game(s) being simulated.

The background generator 78 generates the necessary background required by some games. Thus, for a chess game an 8 × 8 square grid is needed and this is generated by the background generator 78.

In general, to play any game that involves movement, the circuit shown in FIG. 6 is used.

The steps involved are:

1. The player defines the symbol or selects from a catalog of pre-defined symbols available in the computer 18. In most cases the type of game being simulated dictates the symbols used. Thus, for a simulated ping-pong game, we need a round symbol and a symbol that looks like a tennis paddle. The background, which in most cases defines the boundaries of the game, is also dictated by the type of game to be played.

Once the background and the symbols to be used have been selected, the control program is read into the computer and the game begins. The players could then use their control boxes 12 to manipulate the symbols on display and the computer can act as a referee, an opponent, etc.

As an illustration, one of the games that could be played is SPACE WAR. The main intent of the game is to simulate the action of a rocket. As a war game, the players try to destroy their opponent's rocket or we could put our rocket in orbit and try to dock with other rockets also in orbit.

The steps involved are:

a. move rocket to launch pad, b. launch rocket, c. put rocket into orbit, d. bring rocket back to launch site or recovery site.

1. In this game, the rocket may be modeled as a particle. Then to move rocket to launch site, the equation of motion is:

$$\dot{x} = a; \dot{y} = b; \dot{z} = o$$

The above equation is generated in the player control box 12 by setting:

$$a_{12} = a_{21} = o$$

S8 to $a$ and S9 to $b$. This is done by setting S2 and S3 to position 2 and using S1 and S4 to control the direction of motion. R1 and R4 control the speed of motion. At the launch site the rocket is stopped by switching S1 and S2 to position 2.

2. The equation of motion required to simulate the movement of rockets in space is:

$$\dot{x} = a$$

$$\dot{y} = b$$

$$\dot{z} = c$$

R5 is used to set maximum altitude and range; R1 and R4 the ground speed. Once all of the parameters have been set up, the rocket is launched by depressing S7 and using S1, R1, R4, S4, S5 and S6 to control motion of the rocket.

3. The equation of motion of a rocket in an orbital plane is:

$$\dot{x} = a_{11} \times + a_{12} y$$

$$\dot{y} = a_{21} \times + a_{22} y$$

$$z = k$$

Once the rocket has reached its orbit height $k$, it can be put into orbit. The shape and size of the orbit is determined by R1, R2, R3, R4, S1, S2, S3 and S4.

4. To bring the rocket back to a recovery position, S2 and S3 are set to position 2. S1, R1, S4, R4, S5 and S6 are used to control the return path. This is the opposite of launching the rocket.

To dock two or more rockets, their $x, y, z$ coordinates must agree. This could be achieved by controlling the parameters in the equation.

A missile is the same as a rocket so the same circuit could be duplicated. To fire a missile from the rocket, the initial position of the missile must be set to the same position as the current $(x, y, z)$ of the rocket to give the sensation of a missile coming from rocket.

If all of the potentiometers and all of the switches in FIG. 6 are voltage controllable, then it is possible to simulate remotely controlled objects. Thus, to play ping-pong a remotely controlled motion generator is needed.

The background generator 78 is used to generate all the building blocks required to play games like chess, scrabble, crossword puzzle, card games, and the like.

In each case, the distinct feature is isolated and then used as building blocks to generate the playing surface and the objects to use in playing the game. The light pen 22 or player control box 12 is used to move objects from one location to another and controls 20 in the player control box are used to send control information to the computer.

In games involving chance, a random number generator program could be stored in the computer and this program will generate a random number whenever the key simulating a dice is depressed.

With the background generator 78, it is possible to simulate any board or card game, or any game that could be modelled as such. In playing board or card games, there is usually a need to move one symbol from one location to another. This function could be performed by either the light pen 22 or the player control box 12.

To use the light pen 22 to move an object from one location to the other, the steps involved are as follows:

1. Point the light pen to the screen and press a test button on the player control box 12. This tells the computer 18 that you are only trying to locate your position. The square or grid point in which the pen is pointed to will start blinking.

2. If a player is sure that the correct square is blinking, press a source button on the player control box 12. This tells computer 18 that that is where the player wants to move from. The square continues blinking even if the pen is removed until either the DESTINATION button or the ERROR button is pressed.

3. Step 1 above is repeated to get the address of DESTINATION.

Once the computer collects the above information, it can complete the move.

The player control box 12 may also be used to move objects from one location to another either by using the keyboard to send the actual address of the source and destination or by generating a cross or dot on the screen and then using the player control box 12 to move it from one location to another. The control functions are the same as that of the light pen 22.

Having thus described the invention, what I claim and desire to obtain by Letters Patent of the United States is:

1. A system for generating and controlling symbol-producing signals for display on the screen of a television receiver, comprising:
   (a) a multiplexer,
   (b) a plurality of manual control units operatively connected to said multiplexer for operation by individual players, and including symbol position and control means for generating and transmitting symbol position and control signals,
   (c) a plurality of light pens operatively connected to said multiplexer for operation by individual players, each of said pens including light responsive means and pulse producing means responsive to said light responsive means,
   (d) a display unit adapted to be located remotely from and responsive to a control unit, said display unit adapted to receive said symbol position and control signals from said control units,
   (e) changeable memory means providing program instruction,
   (f) a modem providing an interface between said memory means and said display unit,
   (g) timing control means operatively connected to said multiplexer for cyclically scanning said multiplexer,
   (h) said display unit including symbol generator means for generating symbols for display on said screen, modulator means connecting between said receiver and said symbol generator means responsive to said symbol generator means and said light pens for generating positional information, and computer means operatively connected to said symbol generator means, said background generator means and said multiplexer for controlling the operation thereof.

2. A system, according to claim 1, wherein said timing control means includes a clock generator, said clock generator including a phased locked loop device and a counter, said devices including a phase detector, a filter and a voltage controlled oscillator.

3. A system, according to claim 1, wherein said background generator includes a plurality of counters adapted to be loaded with signals corresponding to the coordinate position of the background data for display on said screen, a pair of memories connected to said counters and a register connected to both of said memories and at least one of said counters, said register and at least one of said counters receiving clock signals for shifting the contents of said register and said one counter in timed sequence.

* * * * *